(12) United States Patent
Dahan et al.

(10) Patent No.: US 6,611,580 B1
(45) Date of Patent: Aug. 26, 2003

(54) METHOD AND SYSTEM FOR ADAPTIVELY ADJUSTING MODEM OPERATING CHARACTERISTICS

(75) Inventors: Meir Dahan, Lincolnwood, IL (US); Assem M. Koniali, Hoffman Estates, IL (US); Lee Pan, Buffalo Grove, IL (US); Boris Kolot, Wilmette, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/539,201

(22) Filed: Mar. 30, 2000

(51) Int. Cl.$^7$ .............................................. H04M 11/00
(52) U.S. Cl. ................................ 379/93.29; 379/93.05
(58) Field of Search ........................... 379/93.29, 93.05, 379/398, 399.01, 399.02, 400, 93.01, 93.28, 394, 395.01

(56) References Cited

U.S. PATENT DOCUMENTS

| | | | | |
|---|---|---|---|---|
| 4,841,561 A | * | 6/1989 | Hill ........................... | 379/93.29 |
| 5,430,793 A | * | 7/1995 | Ueltzen et al. ........... | 379/93.29 |
| 5,608,795 A | * | 3/1997 | Gay ............................. | 379/399 |
| 5,712,977 A | * | 1/1998 | Glad et al. ................ | 379/93.29 |
| 5,802,169 A | * | 9/1998 | Frantz et al. ................ | 379/398 |
| 6,081,586 A | * | 6/2000 | Rahamim et al. ......... | 379/93.29 |
| 6,091,806 A | * | 7/2000 | Rasmus et al. ........... | 379/93.29 |
| 6,128,373 A | * | 10/2000 | Mathe et al. ............ | 379/93.29 |
| 6,282,271 B1 | * | 8/2001 | Gutzmer et al. ......... | 379/93.05 |
| 6,396,922 B1 | * | 5/2002 | Khuat ......................... | 379/394 |

OTHER PUBLICATIONS

Multitech Systems, *Multi–Tech's Global Modems*, http://www.multiceh.com/GlobalModem, Apr. 7, 2000, pp. 1–3.

Multitech Systems, *Global Modem Configuration*, http://www.multitech.com/GlobalModem.config, Apr. 7, 2000, pp. 1–3.

Multitech Systems, *Global Modem Country Approvals*, http://www.multitech.com/GlobalModem/approvals, Apr. 7, 2000, pp. 1–2.

Multitech Systems, *Global Modems Ordering Information*, http://www.multitech.com/GlobalModem/order, Apr. 7, 2000, pp. 1–2.

* cited by examiner

*Primary Examiner*—Stella Woo
(74) *Attorney, Agent, or Firm*—McDonnell Boehnen Hulbert & Berghoff

(57) ABSTRACT

A method and system for adaptively adjusting modem operating characteristics is disclosed. A modem includes a line interface circuit and a controller. The modem is programmed (such as by user-input) with an indication of a location (e.g., country or region) where the modem is operating. When going off hook, the controller sets the modem off hook impedance to a level that would be likely to be sufficient and acceptable under applicable governmental regulations. Upon going off hook, the controller then senses the actual line voltage at the modem, and, if it turns out that the modem is not within an acceptable operating range, the controller adjusts the off hook impedance of the modem so as to bring the modem into an acceptable operating range. The invention advantageously helps reduce the need to produce numerous different versions of a given modem, instead facilitating the production of a "global" modem.

29 Claims, 5 Drawing Sheets

METHOD AND SYSTEM FOR ADAPTIVELY ADJUSTING MODEM OPERATING CHARACTERISTICS

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

MICROFICHE APPENDIX

This patent document includes a microfiche appendix, including 1 microfiche with 15 frames.

BACKGROUND OF THE INVENTION

1. Field of the Invention

The present invention relates to modems and more particularly to the electrical operating characteristics thereof.

2. Description of Related Art

Countries throughout the world impose various different standards for modem operating characteristics/ranges. The United States, for instance, expects a linear current-voltage curve, to provide a relatively constant impedance, regardless of the particular impedance. Japan, in contrast, requires an impedance of no greater than 300Ω. (If the device has an impedance of 100Ω, it might draw 30 mA, whereas, if the device has an impedance of 300Ω, it might draw 10 mA.) In still further contrast, Europe (the CTR21 spec) does not restrict impedance but specifies that (i) current cannot exceed 60 mA (upon rising to 60 mA, the voltage can skyrocket, but the current must not rise further) and (ii) if the device draws more than a certain current, it must not exceed a certain voltage. Still other countries might specify different types of operating characteristics.

Due to the variations in modem operating characteristics required throughout the world, manufacturers of modems have been unable to define a single universal device that will comply with all operating specifications. For instance, while the slope of the linear curve required by the United States can be varied so as to comply with Japan's maximum 300Ω specification, the linear curve cannot be modified so as to comply with Europe's non-linear operating characteristic.

As a result, modem manufacturers have been forced to design and build several different flavors of a given version modem, where one flavor complies with the operating characteristics of one or more countries, another flavor complies with the operating characteristics of another country, and so forth.

A further difficulty arises from the possible variation in line current in a given country and a variation in line voltage depending on where the modem is positioned in relation to the telephone company central office. As an example, if a modem is located thousands of meters from the central office, the line impedance could result in a substantial voltage drop by the time the current reaches the modem. In contrast, if the modem is located only several meters from the telephone company central office, little voltage drop will occur on the line. As a result, a modem that might operate in the required range at one location in a given country may operate outside of the range at another location in the same country.

In view of the foregoing, the present inventors have discovered a need for a method and system to allow a modem to operate under a variety of conditions, so as to reduce or eliminate the need to produce multiple variations of a given modem.

SUMMARY OF THE INVENTION

The present invention provides a system for automatically adapting modem operating characteristics to meet a variety of specifications and line conditions. The invention is usefully employed when a modem is going off hook, before the modem enters a conventional handshaking state or other form of communication over the telephone line to which it is connected.

According to one aspect, the modem is provided with a line interface circuit and control logic. When the modem is first used, a user may input an indication of the country or region of operation of the modem. For instance, the user may indicate through a graphical users interface that the modem is being used in a particular country. Provided with this indication, the control logic may load into memory an indication of the location of operation, for use in adapting the operating characteristics of the modem to that location.

According to another aspect, the line interface circuit is electrically adaptable to meet desired and required operating characteristics. The circuit may, for instance, have selectively modifiable impedance and current segments. The control logic may cause these segments to change states so as to change the overall operating characteristics of the modem.

In this regard, if the modem had a way to know the voltage provided by the central office and the line impedance (along the telephone line between the central office and the modem), then the modem could adapt its operating characteristic as presently contemplated to interface with the telephone line in a way that would comply with applicable specifications. In particular, by knowing the supply voltage and the line impedance, control logic in the modem could readily compute the line voltage at the modem given various levels of modem impedance. Thus, the control logic could then adjust the modem impedance so as to comply with the applicable specification. In most cases, however, it is not possible to directly measure the actual line impedance, or at least to do so quickly enough to reach an acceptable operating state within an acceptable timeframe. (The European specification, for instance, requires a modem to reach the specified operating range within 20 milliseconds).

Thus, rather than actually measuring the line impedance, an exemplary embodiment of the invention starts by assuming what the line voltage will be. In particular, when the modem is about to go off hook (e.g., in response to an incoming or outgoing call), the control logic sets (or prepares to set) the off hook operating characteristics of the line interface circuit to a state that would be acceptable under the applicable specification, given some assumption of what the actual line voltage will be. The off hook operating characteristics are one or more electrical characteristics that will be exhibited by the modem (from the perspective of the telephone line, for instance) upon going off hook. These characteristics may include impedance, voltage, current or some combination of these or other measures. The line interface circuit may include a bridge circuit to extract a DC signal from the telephone line, so that the characteristics at issue may be substantially or completely DC characteristics.

Upon going off hook, the control logic may then detect the actual line conditions at the modem, such as the actual line voltage and current being drawn by the modem. With this information, the control logic may then determine whether the actual line conditions are (i) sufficient to allow operation of the modem and (ii) in compliance with the applicable specification. If the line conditions do not satisfy either or both of these criteria, then the control logic may adjust the state of the line interface circuit in an effort to change the operating characteristics of the modem to an acceptable state.

It is possible, for instance, that the system might assume that the line impedance is 1 kΩ, but the line impedance may actually be 3 kΩ. As a result of the assumption, the line voltage drop will be higher than assumed, so (assuming a constant modem impedance) the line voltage actually provided to the modem will be lower than assumed, resulting in the modem drawing less current than expected. If the voltage is too low for the modem to operate, or the current is too high for compliance with the applicable specification, or if otherwise desired, the system may rectify the situation by adapting the electrical operating characteristics of the modem. In particular, the system may adjust the modem impedance so as to draw less current, and to thereby decrease the line voltage drop and consequently increase the voltage across the modem.

According to another aspect, the line interface circuit may be adapted further to help ensure that the power supplied to components of the modem (such as components of the line interface circuit) does not exceed ratings. In doing so, again, the control logic may be cognizant of the operating range and applicable specification(s), so as to help ensure that the modem operates acceptably.

Thus, in one respect, the invention may take the form of a telephone device such as a modem, telephone, answering machine or fax machine. The telephone device includes a circuit that can be interconnected to a telephone line. The circuit may be selectively configured so as to present a desired off-hook impedance from the perspective of the telephone line. For this purpose, the circuit may include a gyrator circuit with selectively adjustable impedance (e.g., a transistor controlled impedance) and a loophold circuit with a selectively adjustable characteristic such as current or voltage (either correlating in turn with impedance).

The telephone device further includes a controller coupled with the circuit. The controller includes logic to determine an electrical characteristic of the telephone line (such as a line voltage received by the telephone device, and/or a line current drawn by the telephone device) and to responsively adjust the off hook impedance of the circuit so as to bring at least one electrical operating characteristic of the telephone device within an acceptable range. In particular, the controller may alter the voltage to the base of a transistor in the gyrator circuit so as to change the gyrator impedance, and the controller may change the current drawn by the loophold circuit and/or the voltage consumed by the loophold circuit (either correlating with a change in impedance).

The acceptable range within which the controller brings the circuit may be imposed by a government specification (or, equivalently, any type of regulatory or industry standard specification or the like). Alternatively or additionally, the acceptable range could be that range which would be required in order to allow at least some portion of the telephone device to function. For instance, the controller might require a certain minimum voltage level in order to function. So the acceptable range might be the range suitable to supply that minimum voltage level to the controller.

In another respect, the invention may take the form of a modem that can be adapted for use under a variety of operation specifications (e.g., government specifications as described above). The modem may include a circuit for interfacing with a telephone line, and the circuit may have at least one selectively adjustable electrical characteristic. In turn, the modem may include control logic coupled with the circuit and arranged to measure an electrical characteristic on the telephone line and responsively adjust an operating characteristic of the modem.

For instance, if the control logic determines that the current being drawn by the modem exceeds that allowed by the specification imposed by the country in which the modem is located, the control logic may raise the off hook impedance of the circuit so as to reduce the line current to the modem. In that way, the control logic can adaptively bring the modem into compliance with the specification.

The modem could also include a set of logic for receiving a user-provided indication of the location of operation of the modem. The user might provide this information during installation of the modem, for instance. The control logic may then determine one or more aspects of the applicable specification for that location based on the supplied indication.

In yet another respect, the invention may take the form of a method for adaptively configuring an operating state of a modem. The modem may have a circuit for electrically interfacing with a telephone line. The circuit may define an impedance with respect to the telephone line, and the circuit may be selectively switchable between an off hook state with respect to the telephone line and an on hook state with respect to the telephone line.

The method can include the steps of first setting an off hook impedance of the circuit and then, upon going off hook, measuring the line voltage at the modem and adaptively adjusting the off hook impedance of the modem if the line voltage is below some predefined threshold level.

In turn, the method can include measuring (computing) the line current being drawn by the modem and determining whether that line current exceeds a predefined threshold current level (such as a maximum current level set by a regulatory specification for instance). If so, the method might then include modifying the impedance of the circuit further so that the line current does not exceed the threshold.

Further, the method can include determining whether the off hook impedance exceeds (is greater than or less than) some predefined limit (such as a threshold set by a regulatory specification for instance). If so, then the method may include modifying the off hook impedance further so that it does not exceed the limit.

These as well as other features and advantages of the present invention will become apparent to those of ordinary skill in the art by reading the following detailed description, with appropriate reference to the accompanying drawings.

BRIEF DESCRIPTION OF THE DRAWINGS

A preferred embodiment of the present invention is described herein with reference to the drawings, in which.

DETAILED DESCRIPTION OF THE PREFERRED EMBODIMENT

Figure 1:
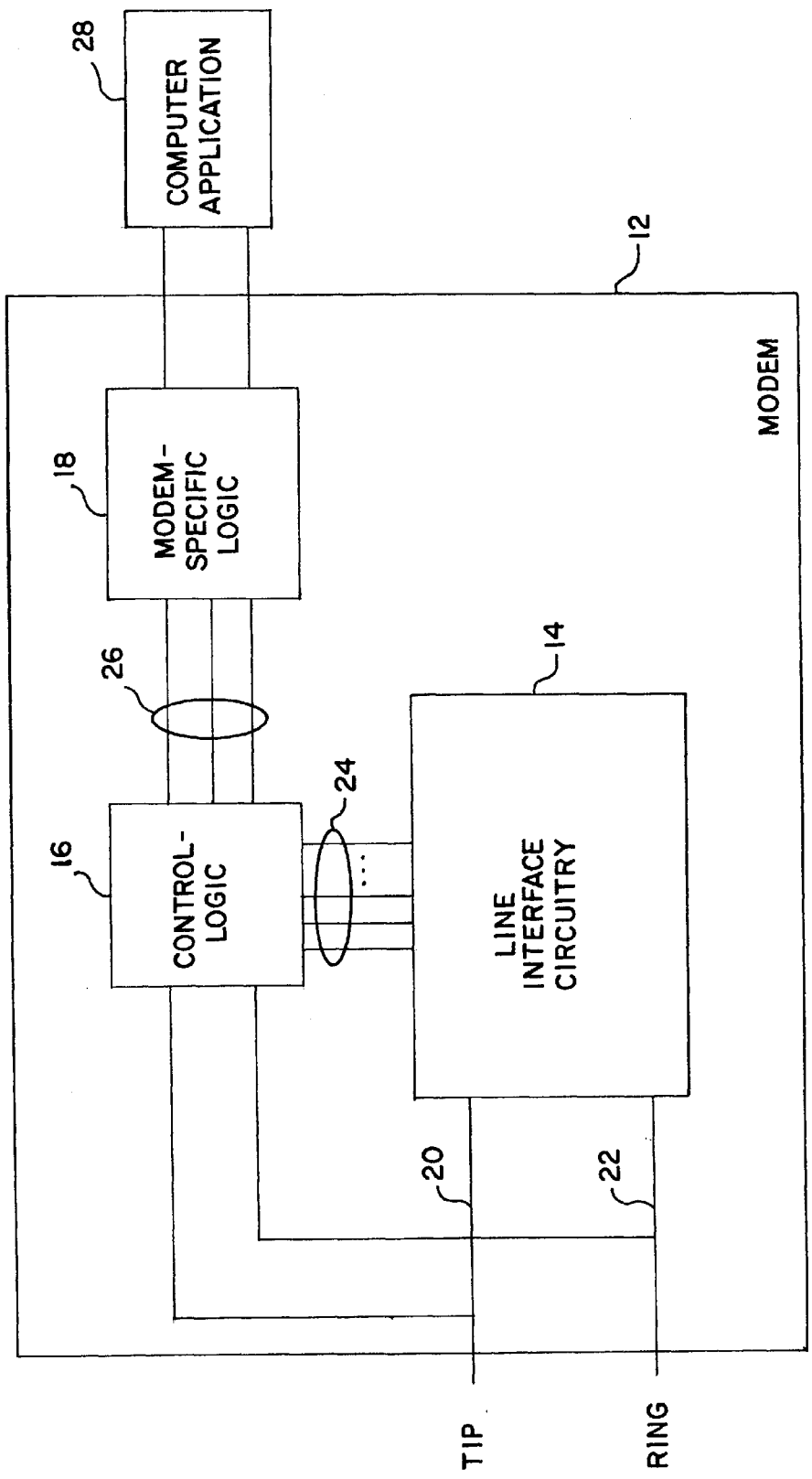
FIG. 1 is a block diagram depicting a modem with adaptive line interface functionality according to an exemplary embodiment of the invention.

Referring to the drawings, FIG. 1 is a block diagram illustrating a modem 12 arranged in accordance with an exemplary embodiment of the invention. As shown in FIG. 1, modem 12 includes a line interface circuit 14, control logic (e.g., an ASIC or a DSP chip) or "controller" 16, and modem-specific logic 18. Line interface circuit 14 is coupled with the tip and ring wires 20, 22 of a telephone line. In addition, the tip and ring wires extend to control logic 16. Control logic 16 is coupled with line interface circuitry by several conductors, designated cooperatively by reference numeral 24.

In turn, control logic 16 is coupled by a bus 26 to the modem-specific logic 18. Modem-specific logic 18 includes modulation and demodulation functionality (as well as supplemental functions such as fax and answering machine functions). Modem-specific logic 18 may comprise hardware, software, firmware or any combination of these or other structures.

In general operation, when modem 12 is receiving an incoming call or initiating an outgoing call, the modem draws current from the telephone line, which signals to a central office that the modem is off hook. Once the modem goes off hook, the modem may engage in a handshaking sequence via the telephone line, to establish modulated communication with a remote end. Control logic 16 may serve as an analog/digital converter, to sample incoming voice-band signals from the telephone line and provide a corresponding bit stream via bus 26 to modem-specific logic 18, and vice versa. The modem-specific logic may then demodulate the signal and provide a demodulated bit stream to a computer application 28, and vice versa.

Modem 12 may be connected externally or internally to a personal computer or other device. Alternatively, some or all portions of modem 12 may be integrated into the personal computer or other device. For instance, the modem may be a software-based modem, where waveform processing associated with the modulation and demodulation functions is performed by a host computer processor rather than a discrete modem signal processor. Nevertheless, the modem will typically need to interface with a telephone line or other communications link, which will usually comprise an electrical circuit (although it could take other forms).

Often, the telephone line is part of a public network. Therefore, the electrical operating characteristics of the modem when connected to the line are commonly subject to governmental regulations. Further, as indicated above, the line conditions may actually vary depending on where the modem is physically located in relation to the central office at the other end of the line.

According to an exemplary embodiment, line interface circuit 14 and control logic 16 cooperatively enable modem 12 to adapt to various line conditions and regulatory specifications. As indicated above, such specifications and line conditions might vary widely from location to location. Typically, the parameters of regulatory specifications are known and usually depend only on the country or region in which the modem is being operated. The line conditions, on the other hand, are usually not known in advance but, as presently contemplated, can be detected when the modem goes off hook.

In accordance with the exemplary embodiment, a user will supply the modem with an indication of the country or region in which the modem is located (or other indicia that may help to determine a desired set of operating characteristics). This can be done as part of a modem installation procedure. For instance, when a user first installs modem 12, the user might conventionally run an installation program on a personal computer associated with the modem. Through a graphical user interface, the installation program may prompt the user to specify a location (e.g., country or region) of operation. The user may then indicate the location of operation, such as by selecting an entry from a drop down list. The computer may then provide the modem with an indication of the selected location, and the modem may store a corresponding indication in a suitable data storage medium (e.g., flash memory) for later reference.

Of course, other means could be employed to provide a location indication to the modem. For instance, if the modem is connected with, or otherwise associated with, a computer, and if the computer knows its location of operation, the computer could be arranged to automatically communicate this information to the modem upon installation or at another suitable time.

In order to facilitate adapting the modem operating characteristics to the location of operation, control logic 16 may store (or set) a flag or other indicator of the location. The modem may then Include a stored table or other logic defining the criteria dictated by the applicable specification for that location. Control logic 16 may at times refer to this table or other logic to help determine how it should proceed. Control logic 16 may further load parameters defining the applicable criteria into memory for convenient reference.

In addition, control logic 16 may be hard-coded with logic or code routines specific to various locations. For instance, one such routine might facilitate compliance with one country's specification, while another such routine may facilitate compliance with another country's specification. Depending on the location of operation, the control logic may selectively invoke one or more of these location-specific routines.

Figure 2:
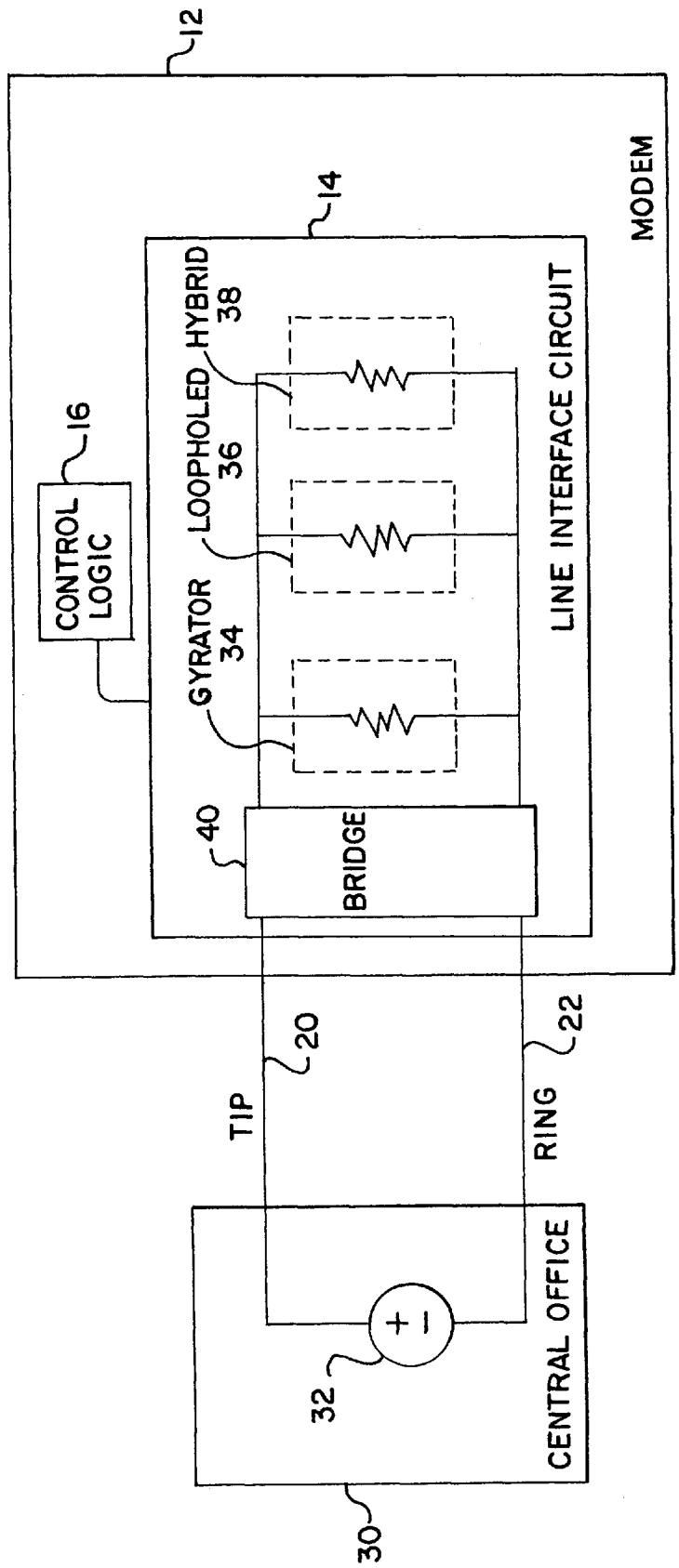
FIG. 2 is a generalized schematic illustrating the arrangement and operation of an exemplary embodiment of the invention.

Referring now to FIGS. 2, a generalized schematic is provided to illustrate the arrangement and operation of an exemplary embodiment of the invention. As shown in FIG. 2, a telephone company central office 30 includes a power supply 32, coupled by a telephone line (tip and ring wires 20, 22) to line interface circuit 14. It should be understood that, when modem 12 is on hook, line interface circuit 14 is connected to the telephone line but draws virtually no current from the line. Phrased another way, the on hook impedance of modem 12 is nearly infinite. When modem 12 goes off hook, an active circuit is established. Line interface circuit 14 begins to draw current from central office 32.

Line interface circuit 14 can take a variety of forms. However, a preferred line interface circuit 14 includes a three stage circuit. As shown in FIG. 2, the first stage is a gyrator circuit 34, the second stage is a loophold circuit 36, and the third stage is a hybrid circuit 38. Generally speaking, gyrator circuit 34 provides a selectively variable impedance, loophold circuit 36 draws a selectively variable current, and hybrid circuit 38 draws a relatively fixed current. In a preferred embodiment, modem 12 includes a bridge circuit 40, which extracts a DC signal from an AC waveform provided by the central office.

Control logic 16 serves to select an impedance for gyrator circuit 34 and a current draw for loophold circuit 36. By changing these parameters, control logic 16 can vary the equivalent impedance and total current draw of the line interface circuit, so as to help ensure that electrical operating characteristics of the modem are sufficient (e.g., that the modem obtains a sufficient voltage supply $V_L$ from the telephone line) and in compliance with the regulations for the location of operation.

Figure 3:
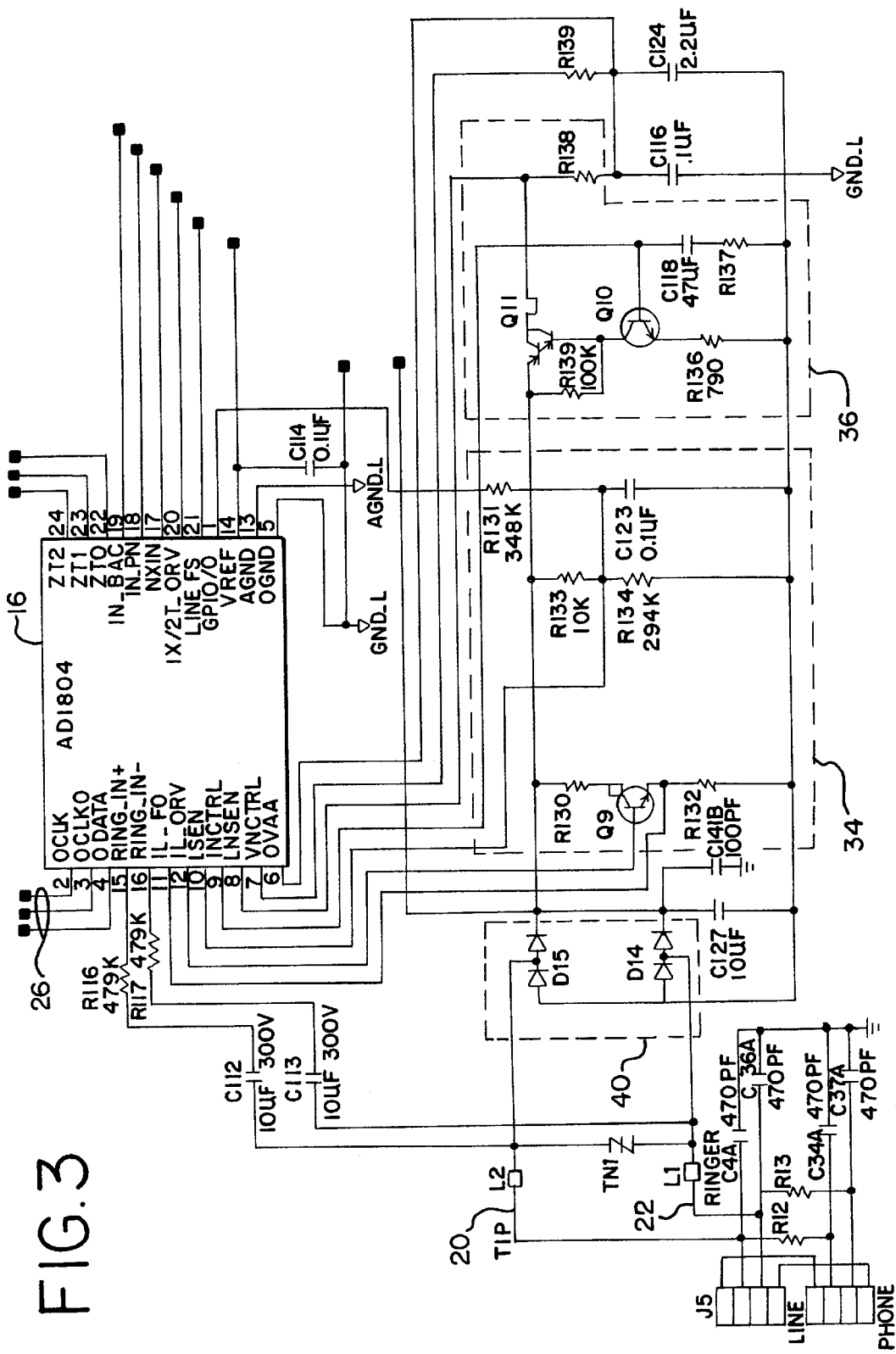
FIG. 3 is a more detailed schematic depicting a line interface circuit and controller according to an exemplary embodiment of the invention.

Referring now to FIG. 3, a more detailed schematic is provided to show the arrangement and operation of line interface circuit 14 and its relationship to control logic 16.

As shown in FIG. 3, control logic 16 takes the form of a discrete chip, such as an ASIC for instance, including pins that are electrically connected to various portions of the line interface circuit. The control logic preferably includes a processor and a set of machine language instructions executable by the processor to carry out the control functions described herein. Provided with this description, one of ordinary skill in the art can readily prepare such a set of instructions and cause a processor to execute the instructions. Further, the control logic could include other forms of logic, such as a field programmable gate array (FPGA) for carrying out these or other functions as well.

As shown in FIG. 3, the tip and ring wires 20, 22 of the telephone line are connected via a jack J5 to a diode bridge circuit 40. The bridge circuit 40 conventionally serves to extract a substantially DC signal from the line. This DC signal is then provided to the three stage line interface circuit, including, in parallel, gyrator circuit 34, loophold circuit 36, and hybrid circuit 38 (not shown).

In the exemplary embodiment, the gyrator circuit 34 comprises a first impedance in parallel with a second impedance. The first impedance includes a resistor R130 (preferably 130Ω) coupled in series with a transistor Q9, coupled in series with a resistor R132 (preferably 26.7Ω), coupled to ground. The second impedance includes a resistor R133 (preferably 10 MΩ) coupled in series with a resistor R134 (preferably 294Ω) to ground. The base of transistor Q9 is linked to control logic 16, so that control logic 16 can vary the base voltage. By varying the voltage to the base of transistor Q9, control logic 16 can vary the current flow through the first leg of the gyrator circuit and thereby effectively change the first impedance of the gyrator circuit.

In addition, the gyrator circuit preferably includes another resistor R131 (preferably 348 kΩ) connected at one end to control logic 16 and at another end to a point between resistor R133 and R134. Control logic 16 may then selectively switch this resistor R131 to ground, to thereby selectively put it in parallel with resistor R134. When resistor R131 is switched in parallel with resistor R134, the second impedance of the gyrator circuit decreases, thereby decreasing the total impedance of the gyrator circuit.

Provided with the preferred component values indicated parenthetically above, control logic 16 can thus set the impedance of the gyrator circuit to a variety of different levels. In the exemplary embodiment, control logic 16 is set to (i) switch resistor R131 in or out of the circuit and (ii) switch the base voltage of transistor Q9 between three discrete levels. Therefore, the control logic can selectively set the impedance of the gyrator circuit to any of six different levels, depicted in the following table:

| MODE | VALUE 1 | VALUE 2 |
|------|---------|---------|
| 1 | 1.7 kΩ | 935 Ω |
| 2 | 1.7/2 kΩ | 935/2 Ω |
| 3 | 1.7/2.5 kΩ | 935/2.5 Ω |

By selectively connecting resistor R133 to ground or not, the control logic 16 can switch the gyrator impedance between a first value (Value 1) and a second value (Value 2). In turn, by selectively switching the base current of transistor Q9 between three levels, the control logic can achieve three different modes of operation. In mode 1, the base voltage is such that, in combination with the other resistors of the circuit, the gyrator impedance is either about 1.7 kΩ or about 935Ω (depending on whether resistor R133 is switched into the circuit or not). In mode 2, the base voltage of transistor Q9 is increased sufficiently to reduce the mode 1 gyrator impedance by a factor of 2. In mode 3, the base voltage is increased sufficiently so as to reduce the mode 1 gyrator impedance by a factor of 2.5.

It should of course be understood that the gyrator circuit can take other forms as well or can be replaced by another type of circuit or omitted altogether. The gyrator circuit of the preferred embodiment, however, has been found to be suitable and robust.

The loophold circuit 36 serves to draw a fixed current at a level specified by control logic 16. The loophold circuit includes a double transistor Q11, whose base is connected to the collector of another transistor Q10, and whose collector is connected to a resistor R138 (preferably 13Ω). The emitter of transistor Q10 is in turn connected to a resistor R136 (preferably 750Ω), and the base of transistor Q10 is connected to control logic 16. In turn, leads across resistor R138 are connected to control logic 16.

By controlling the voltage supplied to the base of transistor Q10, control logic 16 can modify the current flow through the loophold circuit as indicated by the current flow through resistor R138. The control logic measures the voltage across resistor R138 to determine that current level and then modifies it as desired. In an exemplary embodiment, if the control logic is unable to achieve a desired (target) current level for loophold circuit, the control logic sets a "saturation bit" (a flag) in memory indicating this failure. The loophold circuit will typically have a minimum current level of about 2 mA or 3 mA, which is preferred in order to allow some functions of the control logic 16 to work.

Although the loophold circuit of the preferred embodiment is a current-controlled loophold circuit, it should be understood that a voltage-controlled loophold circuit could be employed instead. In either case, the effective impedance presented by the line interface circuit can be altered by changing one or more characteristics of the loophold circuit. Further, it should be understood that the loophold circuit may take still other forms or may be replaced by another circuit or omitted altogether.

The hybrid circuit (not shown in FIG. 3), in turn, typically draws a fixed current level. In the United States, for instance, the hybrid will typically draw 6 mA. In Europe, in contrast, the hybrid will typically draw 4 mA of current as a complex impedance.

Thus, in combination, the three stages of this line interface circuit can draw a particular level of current and provide a particular level of modem impedance (off hook impedance). By adjusting the current drawn by the loophold circuit, or adjusting the current drawn by the gyrator circuit (by changing the impedance of the gyrator circuit), given the relatively fixed current drawn by the hybrid circuit, the total current drawn by the circuit can be varied. Phrased another way, the equivalent impedance of the circuit can be varied.

Figure 4A:
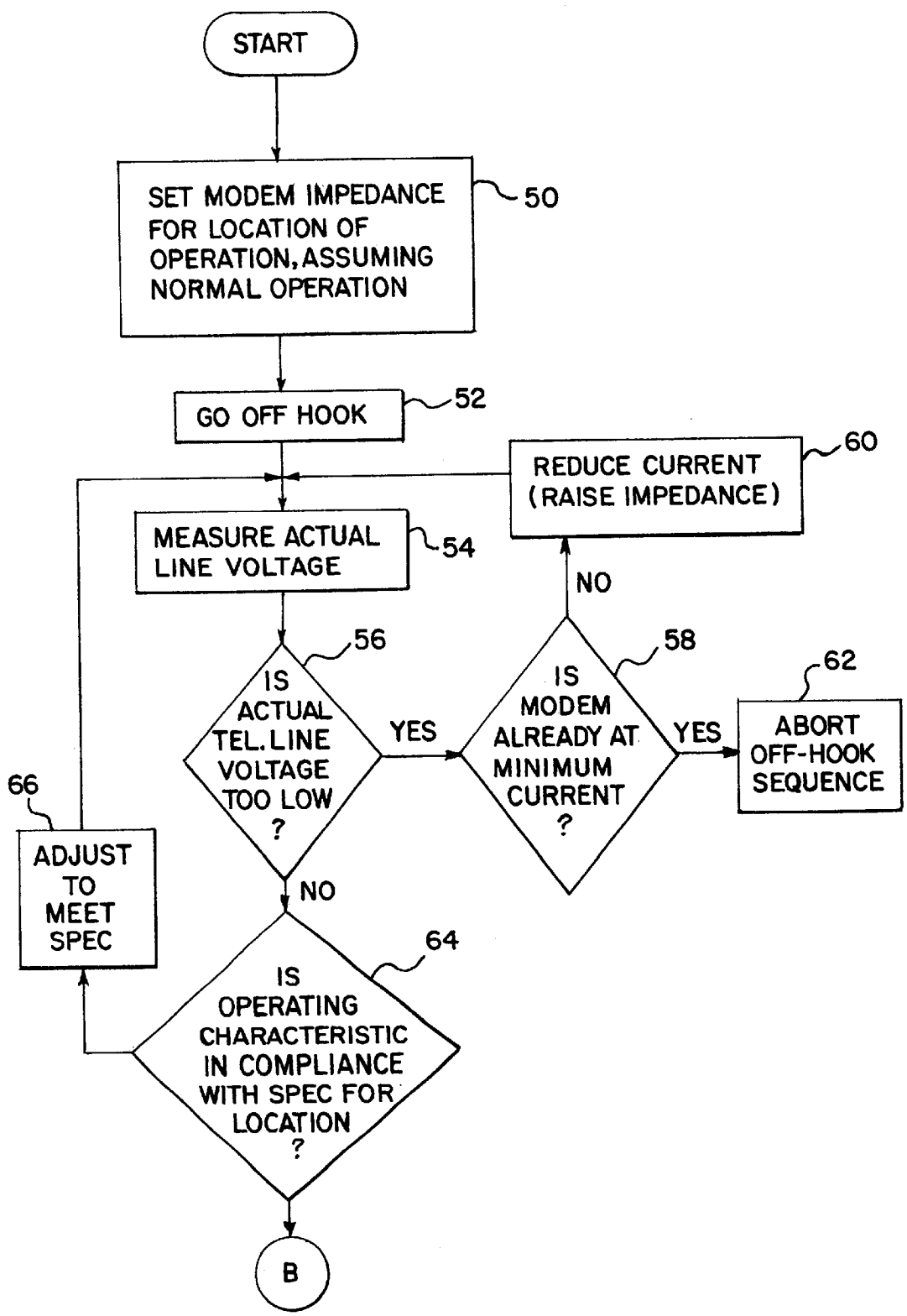
FIG. 4 (two parts) is a flow chart depicting functional blocks employed in an exemplary embodiment of the invention.
Figure 4B:
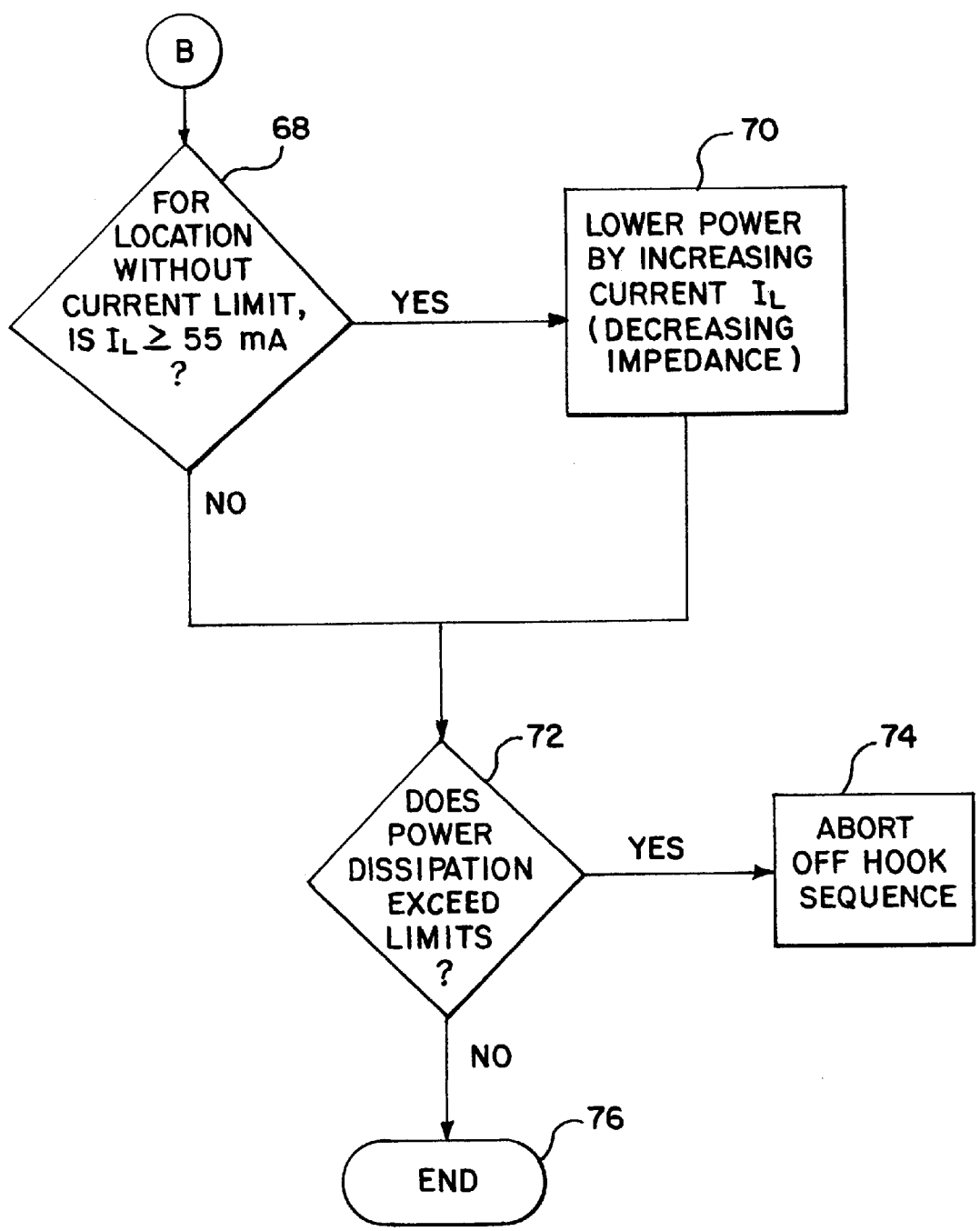

Referring now to FIG. 4, a flow chart is provided, to illustrate the functional operation of an exemplary embodiment. As shown in FIG. 4, at block 50, control logic 16 sets the off hook impedance of the circuit to what is believed to be an acceptable level for the specified location of the modem. In an exemplary embodiment, for instance, the control logic could assume that the modem might operate at an average or median point on the impedance characteristic for the given location. At that assumed point of operation, the impedance characteristic would have the modem draw a line current $I_L$ at a line voltage $V_L$.

For instance, according to United States regulations, a suitable mid-point on the impedance characteristic may call for a line current of 38 mA and a line voltage of 15 V. According to European regulations, a suitable mid-point may call for a line current of 32 mA and a line voltage of 10 V. And according to Japanese regulations, a suitable mid-point may call for a line current of 40 mA and a line voltage of 8.5 V.

Thus, preferably before going off hook, the control logic assumes that the line voltage will be $V_L$ and the line current will be $I_L$. To draw that assumed line current $I_L$, given that assumed $V_L$, the control logic then prepares to set the gyrator impedance $R_{GYR}$ and the loophold current $I_{LPL}$ to levels such that the total of (i) the current drawn by the gyrator circuit ($I_{GYR}=V_L/R_{GYR}$), (ii) the current drawn by the loophold circuit ($I_{LPL}$) and (iii) the relatively fixed current drawn by the hybrid circuit ($I_{HYB}$), would be about $I_L$.

In the exemplary embodiment, the control logic does not actually direct the loophold circuit to begin drawing current until the control logic is ready to go off hook, since, as soon as the loophold circuit begins to draw current, in most configurations, the central office would detect an off hook state. However, the control logic can set the gyrator impedance and can be prepared to set the loophold current to the desired level.

In the exemplary embodiment, a suitable starting level for the gyrator impedance $R_{GYR}$ might be $935/2.5\Omega$ ($374\Omega$), so that the control logic can subsequently increase the gyrator impedance if desired. A suitable starting level for the loophold current may then depend on the total desired current $I_L$.

At block 52 in FIG. 4, the control logic then takes the modem off hook, by turning on the current flow to the loophold circuit (by providing voltage to the base of transistor Q10). The tip and ring signals of the telephone line then pass through the diode bridge circuit and on to the gyrator circuit. In turn, voltage is supplied to the hybrid circuit, which thereby begins to draw current.

Once the modem goes off hook, at block 54, the control logic then measures the actual line voltage at the modem, through a voltage tap between resistors R133 and R134. The control logic then determines, at block 56, whether the actual line voltage is sufficient to allow the modem to operate. In the preferred embodiment, the control logic takes the form of an integrated circuit chip, which powers up on 3.3 V (or 2.9 V). In addition, the diode bridge circuit 40 has a 1.6 V delivery drop. Thus, the minimum voltage required for operation should preferably be a total of about 4.3 V to 4.9 V, or approximately 5 V DC.

If the control logic determines that the actual line voltage is insufficient for operation (i.e., too low), then, at blocks 58–60, in accordance with an exemplary embodiment of the invention, the control logic changes the operating characteristics of the line interface circuit so as to bring the actual line voltage to an acceptable (operational) level. To do so, the control logic preferably first adjusts the loophold current by changing the base voltage of transistor Q10. By reducing the loophold current, less total current is drawn by the modem, which appears as an increased modem impedance. For purposes of this description, this function may thus be considered an increase in the modem impedance (even though it might be accomplished in the preferred embodiment by decreasing the loophold current). The same or a similar function may of course be achieved by a voltage-controlled loophold circuit or other appropriate circuit.

In the preferred embodiment, the control logic reduces the loophold current by increments of ½ mA or 1 mA. After each such increment, the control logic again measures the actual line voltage and determines whether the line voltage is acceptable (in the 4.3 to 4.9 mA range, for instance). If not, then the control logic further reduces the loophold current. In any given instance, if the control logic is unable to further lower the loophold current, but if the line voltage is still too low, the control logic may conclude that the current has saturated. Consequently, the control logic preferably backs up the loophold current by about ½ mA or 1 mA.

In reducing the loophold current, the control logic should avoid bringing the loophold current so low that it exceeds its minimum level (2 to 3 mA in the preferred embodiment). Thus, before reducing the loophold current in each instance, as depicted by block 58, the control logic preferably first checks to ensure that the loophold current is not already at its minimum level. This could involve checking the loophold current or checking the total current being drawn by the modem, for instance.

Once the control logic reaches a minimum desired (or possible) loophold current, if the control logic still has not achieved a sufficient line voltage, the control logic preferably next adjusts the impedance of the gyrator circuit. In the exemplary embodiment, for instance, the control logic may increase the gyrator impedance, so as to draw less current from the line. As a consequence, there will be less of a voltage drop along the line (between the central office and the modem), so more line voltage will be provided to the modem.

In the exemplary embodiment, upon adjusting the gyrator impedance, the control logic measures the actual line voltage again. If the voltage is still too low, the control logic may further increase the gyrator impedance, and so forth. If the gyrator impedance reaches its maximum, and the loophold current reaches its minimum, and the actual line voltage is still too low, then at block 62, the control logic in the exemplary embodiment may abort the effort and switch back on hook.

It should of course be understood that the control logic can adjust the operating characteristics of the line interface circuit in other ways as well. For instance, other circuitry and logic may be provided, and other control functions may be provided. Further, rather than first adjusting the loophold current, the control logic could first change the gyrator impedance. Other alternatives may exist as well.

Once the control logic determines that the actual line voltage is at an acceptable level, in the exemplary embodiment, at block 64, the control logic next checks to ensure that the electrical operating characteristics (e.g., off-hook voltage, current and impedance) of the modem comply with the specification(s) for the location of operation. This analysis will, therefore, depend on the particular requirements of the location of operation. As indicated above, the logic for this analysis may be hard coded into the control logic (as part of code or logic circuitry for instance). Alternatively, the control logic could apply generalized code that will be customized pursuant to stored parameters associated with the location of operation.

For example, if, as indicated above, the modem set up routine stored an indication of the location of operation, the control logic could refer to that indication and responsively call a particular subroutine at this point. The subroutine might cause the control logic to retrieve various measurements (such as the actual line voltage and current being drawn by the modem) and to return an indication of whether the operating state of the modem complies with the specification.

As another example, if, as indicated above, the modem set up routine stored an indication of the location of operation and either stored or had reference to some parameters specially associated with that location, the control logic could be made more general, to be able to act in accordance with those parameters. As one example of this, for instance, the parameters for each location could be coefficients of an equation defining the impedance characteristic required for the location of operation. The control logic could then retrieve various measurements and determine whether the measurements satisfy the impedance characteristic and therefore comply with the specification.

In the event the control logic determines that the operating characteristics of the modem do not comply with the specification for the location of operation, then, at block 66, the control logic then adaptively modifies the characteristics of the interface circuit further.

Assume for instance that the location of operation is Europe, where the CTR21 specification requires an off-hook current of no more than 60 A. In that case, the control logic may determine the total current actually being drawn by the modem, which would be approximately a total of (i) the loophold current, (ii) the hybrid current, and (iii) the measured line voltage divided by the gyrator impedance. If that total current is greater than 60 mA, then the control logic of an exemplary embodiment would conclude that it needs to draw less current. To do so, the control logic could decrease the loophold current and/or increase the gyrator impedance, according to the same procedures as described above. As shown by way of example in FIG. 4, the control logic may then return to block 54 to ensure that the line voltage remains sufficient for operation.

As another example, assume that the location of operation is Japan, where the specification requires an impedance of no greater than 300Ω. In that case, the control logic may measure the actual line voltage and may determine the actual current being drawn from the line as described above. If the voltage divided by the current is greater than 300Ω, then the control logic of an exemplary embodiment may conclude that it needs to reduce its impedance (e.g., by increasing the loophold current and/or decreasing the gyrator impedance). Of course, the adaptive mechanism may take other forms as well.

In the exemplary embodiment, the control logic next performs an operation to safeguard several of the components of the line interface circuit. At least three of the components of the exemplary line interface circuit are power sensitive. These components include (i) the primary transistor Q11 of the loophold circuit, (ii) resistor R130 of the gyrator circuit, and (iii) transistor Q9 of the gyrator circuit. Each of these components is a current sink and therefore gets hot. In the preferred embodiment, transistor Q11 is rated as a 1.5 W device, resistor R130 is rated as a 1 W device, and transistor Q9 is rated as a 1.5 W device. If the power supply to these components exceeds these ratings, the components could fail.

In an exemplary embodiment, the line interface circuit includes a protection circuit, such as coils on the tip and ring lines, in an effort to preclude excessive power from damaging the modem. In addition, the control logic may include a watchdog routine that detects excessive power levels and responsively hangs up the line (aborting the off hook sequence). However, since power is the product of current and voltage, another way to reduce power supplied to the components is to reduce the voltage across the components. To do so, in the exemplary embodiment, the control logic preferably forces the modem to draw more current. Although this initially seems counterintuitive, it works in practice, because, as the modem draws more current, the voltage drop along the telephone line increases, so the voltage supply to the modem decreases.

In particular, at block 68, the control logic preferably measures (computes) the current actually being drawn by the modem and determines whether that current exceeds a predefined level. In the exemplary embodiment, a suitable predefined level is 55 mA, but other predefined levels could be used instead. If the control logic determines that the current exceeds the predefined level, then, at block 70, the control logic increases the current (by decreasing the gyrator impedance and/or by increasing the loophold current). In the exemplary embodiment, the control logic increases the current by 20%, but the control logic could increase the current by another amount instead.

Thus, for instance, if the existing current is 60 mA, the control logic may increase the current to 72 mA, by adjusting the loophold current or the gyrator impedance. After doing this, the control logic may then check again to ensure that the operating characteristics of the modem remain acceptable and within specification.

While it is possible to arrange the control logic to perform this power adjustment in every instance, a modem of the exemplary embodiment will do so only if the location of operation does not have a current limit. Thus, for instance, this power adjustment is preferably not done in Europe, where the current is not supposed to exceed 60 mA. By selectively performing this power adjustment only in a location of operation that does not have a current limit, the exemplary embodiment avoids the need to ensure that increasing the current by 20% will not violate the specification.

Finally, at block 72, in accordance with an exemplary embodiment, the control logic preferably measures the power dissipation in the three components noted above, to ensure that the power dissipation is within the rated range for the components. If the control logic determines that the power level of any of these components is too high, then, at block 74, the control logic preferably aborts and goes back on hook. On the other hand, if the control logic determines that the power levels of these components are acceptable, then, at block 76, the control logic may conclude that the off-hook sequence is complete. The modem may then proceed to a conventional handshaking sequence or other communication, if desired.

Source Code Listing

The microfiche appendix to this document contains a printout of source code for performing the control logic functions described above. This code is written in assembly language, which can be assembled by a DSP assembler available from Analog Devices, Inc. (ADI) of Boston, Mass. and then executed by an ADI DSP. Alternatively, those of ordinary skill in DSP programming can readily convert this code to another processor's assembly language for assembly and execution by another DSP. This code serves as only one example of how to carry out functions described above, and, other than as claimed, it is not intended to be limiting.

CONCLUSION

A preferred embodiment of the present invention has been illustrated and described. It will be understood, however, that changes and modifications may be made to the invention without deviating from the spirit and scope of the invention, as defined by the following claims. For example, although the foregoing description relates mainly to the off hook electrical operating characteristics of a modem (a type of telephone device), the invention can also extend to the off hook electrical operating characteristics of other telecommunications devices, such as telephones, answering machines, fax machines and the like.

Further, the claims should not be read as limited to the described order of elements unless stated to that effect. In addition, use of the term "means" in any claim is intended to invoke 35 U.S.C. § 112, paragraph 6, and any claim without the word "means" is not so intended.

We claim:

1. A telephone device comprising:
    a circuit for interconnecting with a telephone line, the circuit defining a selectively adjustable off-hook impedance using a selectively variable impedance circuit comprises a gyrator circuit having an adjustable impedance;
    a controller coupled with the circuit, the controller including logic to determine an electrical characteristic of the telephone line and to responsively adjust the off-hook impedance of the circuit so as to bring at least one electrical operating characteristic of the telephone device within an acceptable range.

2. A telephone device as claimed in claim 1, wherein the adjustable impedance of the gyrator circuit comprises a transistor, wherein current flow through the transistor is controllable by voltage selectively applied by the controller.

3. A telephone device as claimed in claim 1, wherein the adjustable impedance of the gyrator circuit comprises a resistor, wherein the resistor is arranged to be selectively switched in parallel with another resistor by the controller.

4. A telephone device as claimed in claim 1, wherein the adjustable impedance of the gyrator circuit further comprises a loophold circuit, wherein the loophold circuit defines an electrical characteristic selectively adjustable by the controller.

5. A telephone device as claimed in claim 4, wherein the electrical characteristic selectively adjustable by the controller comprises current drawn by the loophold circuit, whereby an adjustment of current drawn by the loophold circuit correlates to an adjustment of effective impedance of the loophold circuit.

6. A telephone device as claimed in claim 4, wherein the electrical characteristic selectively adjustable by the controller comprises voltage consumed by the loophold circuit, whereby an adjustment of voltage consumed by the loophold circuit correlates to an adjustment of effective impedance of the loophold circuit.

7. A telephone device as claimed in claim 1, wherein the at least one electrical operating characteristic of the telephone device comprises an off-hook impedance of the telephone device.

8. A telephone device as claimed in claim 1, wherein the at least one electrical operating characteristic of the telephone device comprises a line voltage received by the telephone device.

9. A telephone device as claimed in claim 1, wherein the at least one electrical operating characteristic of the telephone device comprises a current drawn by the telephone device.

10. A telephone device as claimed in claim 1, wherein the acceptable range of the at least one electrical operating characteristic of the telephone device is defined by a governmentally imposed specification.

11. A telephone device as claimed in claim 1, wherein the acceptable range of the at least one electrical operating characteristic of the telephone device comprises a range sufficient to enable at least one portion of the telephone device to function.

12. A modem adaptable for use under a variety of operation specifications, the modem comprising, in combination:
    (a) a circuit for interfacing with a telephone line, the circuit having at least one selectively adjustable electrical characteristic using a selectively variable impedance circuit comprises a gyrator circuit having an adjustable impedance; and
    (b) control logic coupled with the circuit, the control logic arranged to:
        (i) measure an electrical characteristic on the telephone line, and
        (ii) in view of the measured electrical characteristic on the telephone line, determine whether the modem is operating in compliance with a particular operation specification, and, in response to a determination that the modem is not operating in compliance with the particular operation specification, adjust the at least one electrical characteristic of the circuit so as to change the electrical characteristic of the telephone line to thereby bring the modem in compliance with the particular operation specification.

13. A modem as claimed in claim 12, further comprising a set of logic for receiving a user-provided indication of a location of operation of the modem, wherein the control logic determines at least one aspect of the operation specification based on the indication of the location of operation of the modem.

14. A modem as claimed in claim 12, wherein the electrical characteristic on the telephone line comprises current drawn from the line by the modem.

15. A modem as claimed in claim 12, wherein the electrical characteristic on the telephone line comprises an impedance of the modem on the telephone line.

16. A modem as claimed in claim 12, wherein the control logic is further arranged to decrease power supplied to at least one component of the circuit, so as to avoid overpowering the component.

17. In a modem having a circuit for electrically interfacing with a telephone line, the circuit defining an impedance with respect to the telephone line, the circuit being selectively switchable between an off hook state with respect to the telephone line and an on hook state with respect to the telephone line, a method for adaptively configuring an operating state of the circuit comprising the following steps:
    (a) when the modem is in the on-hook state, setting an off hook impedance of the circuit to a first impedance level; and
    (b) subsequently, when the modem is in the off-hook state,
        (i) measuring a first voltage level on the telephone line at the modem,
        (ii) determining whether the first voltage level is lower than a predefined threshold voltage level,
        (iii) in response to a determination that the first voltage level is lower than the predefined threshold voltage level, changing the impedance of the circuit to a second impedance level lower than the first impedance level; and
        (iv) computing a first current level based on the first impedance level and the first voltage level,
        (v) determining whether the first current level exceeds a predefined threshold current level, and
        (vi) in response to a determination that the first current level exceeds the predefined threshold current level, modifying the impedance of the circuit to a third impedance level different than the first impedance level.

18. A method as claimed in claim 17, wherein determining whether the first current level exceeds a predefined threshold level comprises determining whether the first current level is greater than the predefined threshold current level.

19. A method as claimed in claim 17, wherein the predefined threshold level is a regulatory current level.

20. A method as claimed in claim 17, further comprising, in combination, as part of step (b), (iv) determining whether the second impedance exceeds a predefined threshold impedance level, and (v) in response to a determination that the second impedance exceeds the predefined threshold impedance level, modifying the impedance of the circuit to a third impedance level different than the first and second impedance levels.

21. A method as claimed in claim 20, wherein determining whether the second impedance level exceeds a predefined threshold impedance level comprises determining whether the second impedance level is greater than the predefined threshold impedance level.

22. A method as claimed in claim 20, wherein the predefined threshold level is a regulatory current level.

23. In a modem having a line interface circuit for electrically interfacing with a telephone line, the circuit being selectively switchable between an off-hook state with respect to the telephone line and an on hook state with respect to the telephone line, a method for adaptively configuring an operating state of the circuit comprising the following steps:

when the modem is in the on-hook state, setting an electrical characteristic of the line interface circuit to a first state; and subsequently, when the modem is in the off-hook state, determining whether an electrical characteristic of the telephone line exceeds a threshold level, and, if so, adjusting the electrical characteristic of the line interface circuit to a second state different than the first state, wherein the electrical characteristic of the telephone line comprises current.

24. A method as claimed in claim 23, wherein the electrical characteristic of the telephone line comprises voltage on the telephone line at the modem.

25. A method as claimed in claim 23, wherein the electrical characteristic of the line interface circuit comprises an impedance of the circuit with respect to the telephone line.

26. A method as claimed in claim 23, wherein the threshold level is a threshold level for the modem.

27. A method as claimed in claim 23, wherein the threshold level is a regulatory level.

28. A modem comprising, in combination:

a line interface circuit having a selectively configurable arrangement of electrical components including a selectively variable impedance circuit comprises a gyrator circuit having an adjustable impedance;

means for measuring an electrical characteristic of a telephone line to which the modem is connected;

means for determining whether the electrical characteristic of the telephone line exceeds a predefined threshold; and means for selectively configuring the arrangement of electrical components in response to a determination that the electrical characteristic of the telephone line exceeds the predefined threshold.

29. A modem comprising, in combination:

a processor;

a memory;

a first circuit for interfacing with a telephone line, the first circuit having an arrangement of electrical components including a selectively variable impedance circuit comprises a gyrator circuit having an adjustable impedance selectively configurable into a first state in which the first circuit has a first electrical operating characteristic with respect to the telephone line and a second state in which the first circuit has a second electrical operating characteristic with respect to the telephone line;

a second circuit for measuring an electrical characteristic of the telephone line and providing to the processor a first signal indicative of the electrical characteristic of the telephone line; and a set of machine-readable instructions stored in the memory and executable by the processor for (i) receiving the first signal, (ii) responsive to the first signal, determining whether the electrical characteristic of the telephone line exceeds a threshold electrical characteristic and, (iii) in response to a determination that the electrical characteristic of the telephone line exceeds a threshold electrical characteristic, sending a signal to the first circuit to cause the first circuit to switch from the first state to the second state.

* * * * *